United States Patent [19]
Delap

[11] Patent Number: 6,068,893
[45] Date of Patent: May 30, 2000

[54] THERMALLY INDUCED COLOR ENHANCEMENT OF NATURAL STONE MATERIALS

[76] Inventor: James D. Delap, P.O. Box 927, Wister, Okla. 74966

[21] Appl. No.: 08/898,311

[22] Filed: Jul. 23, 1997

[51] Int. Cl.[7] ..................................................... B29C 7/02
[52] U.S. Cl. ............................ 428/15; 264/234; 264/345
[58] Field of Search ................................. 428/426, 701, 428/432, 325, 15, 34.5, 324; 63/122; 362/806; 427/180, 190, 196, 299; 501/86; 106/400, 401, 403, 425; 264/234, 345

[56] References Cited

U.S. PATENT DOCUMENTS

| | | | |
|---|---|---|---|
| 2,945,793 | 7/1960 | Dugdale | 204/154 |
| 4,749,869 | 6/1988 | Fournier | 250/492.1 |
| 5,084,909 | 1/1992 | Pollak | 378/64 |
| 5,477,055 | 12/1995 | Skold et al. | 250/492.1 |
| 5,568,391 | 10/1996 | Mckee | 364/469 |

*Primary Examiner*—John J. Zimmerman
*Assistant Examiner*—Abraham Bahta
*Attorney, Agent, or Firm*—James M. Ritchley

[57] ABSTRACT

A method of producing an enhancement in the natural coloration of a sandstone comprises selecting a sample of sandstone having suitable characteristics for the color enhancement method, forming the sandstone sample into a tile, and then heating the tile to a first temperature of between 1200° F. and 1800° F. Additional steps is the method comprise coating the first heated tile with a glaze and heating the glazed first heated tile to a second temperature of between 1800° F. and 2500° F.

3 Claims, No Drawings

THERMALLY INDUCED COLOR ENHANCEMENT OF NATURAL STONE MATERIALS

BACKGROUND OF THE INVENTION

1. Field of the Invention

Disclosed is a stone material that has had its natural color enhanced by heating to a specific temperature. More specifically, the subject invention entails selecting a suitable stone material and heating that stone material through at least one and usually two stages of heating to produce a product that has its colors greatly enhanced over the starting shades of the stone material.

2. Description of the Background Art

Heating has been utilized in the process of thoroughly drying and curing glazes used on pottery and tiles for centuries. Depending upon the exact composition of a glaze or its equivalent and the application procedure, various colors and textures can be generated for the pottery and tiles. However, a color enhancement of the underlying material itself (clays, common stone materials, and the like) is not accomplished without the use of a glaze or similar added substance.

It is also noted that the heating of highly colored and hydrated chemicals (like copper (II) sulfate pentahydrate and many others) produces products that are much less intensely colored (bright blue to bluish-white for the change in heated copper (II) sulfate pentahydrate). Heat dehydrated or even oxidized inorganics simply are less intensely colored than the original hydrated starting materials.

Specifically, U.S. Pat. No. 5,084,909 describes color enhancement brought about in natural and synthetic gem materials by high energy gamma ray fields for extended periods of time (50 to 1000 hours). High energy radiation fields are necessary for this process. It is extremely interesting to note that disclosed in this reference the inventor utilized heat to bleach or remove unwanted colors from the gems (either before or after a well known color enhancement procedure that involved electron bombardment). Therefore, this reference clearly teaches that heat has been utilized not to enhance color but to lessen color intensity in at least gem-type materials.

U.S. Pat. No. 5,477,055 presents a thorough review of the history of coloring precious or semi-precious gem stones via single or combined radiation treatments. The color enhancement process related is a two step method that includes fast neutron irradiation at between 350° C. to 600° C. followed by gamma ray or electron bombardment. Higher temperatures tend to fragment the gem stones. The elevated temperatures (above room temperature) tend to reduce unwanted side (blue-gray) colors.

Presented in U.S. Pat. No. 4,749,869 is a process for irradiating topaz and the product resulting therefrom. A three step method of color enhancement is described in which a sample stone is: 1) exposed to high energy neutrons; 2) exposed to electrons; and 3) heated to between 250° F. (121° C.) and 900° F. (482° C.). The heating step tends to "bleach-out" or remove unwanted side colors, thereby enhancing the desired blue color.

Diamonds may be heat treated to increase desirable colorations. U.S. Pat. No. 2,945,793 illustrates this approach to coloring diamonds. Irradiation by electrons in followed by heating to about 500° C. to, once again, decrease undesirable tints within the diamond.

U.S. Pat. No. 5,568,391 shows an automated tile mosaic creation system in which one step involves heating a glazed tile. The firing of the tiles is merely to cure the glaze into the desired final shade and hardness.

The foregoing patents reflect the state of the art of which the applicant is aware and are tendered with the view toward discharging applicant's acknowledged duty of candor in disclosing information which may be pertinent in the examination of this application. It is respectfully submitted, however, that none of these patents teach or render obvious, singly or when considered in combination, applicant's claimed invention.

SUMMARY OF THE INVENTION

An object of the present invention is to provide a stone product having an enhanced coloration over the natural material and a method of producing color enhancement.

Another object of the present invention is to supply a sandstone product that has its color enhanced by a heating process over naturally occurring colorations.

A further object of the present invention is to disclose a stone product having an enhanced color produced by a two step method requiring heating.

Disclosed is a product and a method of producing the product. More specifically, a the product is a color enhanced stone material which is generated by the series of steps. The method of producing an enhancement in the natural coloration of a sample stone material comprises the steps of selecting the sample stone material having suitable characteristics for the color enhancement method and heating the sample stone material to a first temperature for a desired period of time. Usually, the first temperature is between 1200° F. and 1800° F. and more preferably the first temperature is about 1500° F. The length of time heating occurs at the first temperature can vary from thirty minutes to several hours and is usually about two hours. Commonly, the sample stone material is sandstone shaped into a suitable form, preferably a tile (flattened and generally rectangular to square in shape), for the color enhancement method.

Often, the subject method further comprises the steps of coating the sample stone material, after heating the sample stone material to the first temperature, with a glaze and heating the glazed sample stone material to a second temperature. Usually, the second heating is to a temperature between 1800° F. and 2500° F. and more usually to a temperature of about 2000° F. The final stone product has colors that enhanced well above the colors originally present in the initial sample stone.

Other objects, advantages, and novel features of the present invention will become apparent from the detailed description that follows, when considered in conjunction with the associated drawings.

DESCRIPTION OF THE PREFERRED EMBODIMENT

A preferred embodiment of the subject invention comprises a process for creating or manufacturing stone items. Stone items may include, but not be limited to, tiles, building stones, patio stones or pavers, flag or cobble stones, and the like. For exemplary intentions only, a distinctive and brightly colored tile for decorative purposes is useful and highly desired by many individuals. Such tiles might find usage in floors, counter tops, wall decorations, artistic creations, and the like. The subject process or method produces stone products such as tiles that have dramatically increased or enhanced colors over the initial or natural colors found in the stone.

Frequently, acceptable stone is obtained from a rock quarry or similar source in various shapes, sizes, and thicknesses. For exemplary purposes only and not by way of limitation, tiles will be used as the product to be used in the subject process, but other equivalent, like, or analogous types of products are considered to be within the realm of this disclosure. For tiles, the variously shaped and sized stones are cut by saws into tiles sized according to their end usage. Typically, common floor tiles are cut to about 11½ inches square, 11½ by 5½ inches, and 5½ by 5½ inches. Counter top and shower tiles are usually ⅜ inch thick and again sized for end usage, but mainly 3 by 3 inches.

The stone tiles can be made from any type of stone including sandstone, marble, slate, granite, and the like. For the subject method the material from which the tiles are fabricated needs to be a composition that is subject to color enhancement upon the heating steps detailed below. Sandstone appears to have suitable color enhancement properties for the subject method, but other stone materials are acceptable, as long as the color intensification occurs upon applying the subject process.

Once again, the subject process or method is utilized with any type of stone having chemical and/or physical properties that permit the stone to enhance its colors during the subject method. The exact chemical and/or physical property constraints on the stone is not entirely clear, however, a suitable sandstone composition is described below in the EXAMPLES section of this disclosure. The particular pieces of stone utilized to reduce to practice this invention were sandstone samples obtained from Oklahoma, but similar stone or sandstone materials are acceptable as long as they undergo the color enhancement as a result of the subject process.

After cutting the sandstone tiles, the tiles are usually air dried at ambient temperature before the subject heating process is initiated. The air drying may be facilitated by standard mechanical and electrical means such as heaters, blowers, vacuum equipment, heating lamps, ovens, and the like. The time for the air drying may vary from about thirty minutes to several hours or several days, with an overnight drying generally acceptable.

After the initial drying, usually, the selected and shaped stone (tile or other shape) is placed in a kiln, oven, furnace, or the equivalent and heated to a first temperature of between about 1200° F. and 1800° F., preferably about 1500° F. for between thirty minutes to several hours or days, depending upon the desired level of color enhancement. Following the first heating, the stone is cooled to ambient temperature.

The initial first heating serves at least three functions: 1) the original colors are intensified and patterns in the stone appear more pronounced (some of the original colors may not be altered, but clearly many are in acceptable stone materials); 2) it removes most, if not all, of the remaining moisture or liquids from the tile thereby reducing warping of the tile; and 3) it stresses defective tiles and any defects are usually detected at this point.

A second heating usually follows the first heating in which the previously heated stone is first glazed with glazing material such as glass glaze or its equivalent. Frequently, the glazing process coats the entire outside of the stone with glaze. Generally, each stone product that has been heated to the first temperature and wetted with glaze is placed in a tray filed with sand. A layer of sand adheres to the bottom of each stone item. The glazed first heated stone is then heated in the same or similar heating device to a second temperature. The second temperature is usually between 1800° F. and 2500° F., preferably, about 2000° F. The second heating is often for a period of time between about 30 minutes and several hours or days, more usually about one to six hours, preferably about two hours.

After the second heating the stone products or tiles are allowed to cool. When removed from the trays, the stones or tiles have a rough lower surface, due to the adhered and baked sand layer. For tiles, the rough under-surface aids in producing a good bond when the tiles are fitted and glued into position on a floor, counter-top, shower, and the like.

EXAMPLES

Type of Acceptable Sample

A typical sample of acceptable stone for the subject process (acceptable stone is stone that when heated in the subject process has its color intensified or enhanced) is analyzed below (analyzed by Nevada Bureau of Mines and Geology Laboratories, Mail Stop 178, Reno, Nev. 89557):

Sample Type: A piece of dense, fine- to very fine-grained sandstone, consisting chiefly of quartz grains with minor muscovite flakes, and all are cemented by ferruginous matter.

Sample Analysis:

TABLE 1

| Elemental Part-Per Million Analysis | |
|---|---|
| Element | Parts per Million (ppm) |
| Barium | 22 |
| Cobalt | 2 |
| Chromium | 414 |
| Gallium | 6 |
| Niobium | 8 |
| Nickel | 16 |
| Rubidium | 7 |
| Strontium | 21 |
| Lead | <10 |
| Vanadium | 28 |
| Tungsten | <10 |
| Yttrium | 16 |
| Zinc | 39 |
| Zirconium | 351 |
| Tin | <10 |

TABLE 2

| Compound Percentage Analysis | |
|---|---|
| Compound | Percentage (%) |
| $SiO_2$ | 94.6 |
| $TiO_2$ | 0.248 |
| $Al_2O_3$ | 2.19 |
| $Fe_2O_3$ | 1.96 |
| MnO | 0.019 |
| MgO | <0.2 |
| CaO | 0.011 |
| $Na_2O$ | 0.325 |
| $K_2O$ | 0.147 |
| $P_2O_5$ | 0.037 |
| LOI (gases) | 1.15 |
| TOTAL | 100.7 |

Color Enhancement Process

A sample of the above described sandstone typically has a swirled pattern with brown to reddish colors. Tiles cut to various sizes were fabricated from the above sandstone.

Each tile was air dried and then heated in a kiln to about 1500° F. for about two hours. Each tile was coated with traditional glass glaze and placed in trays of sand. The tiles were then heated for about two hours at about 2000° F. After cooling, the tiles had a greatly enhanced intensity of colors and the swirled patterns were much more apparent. Presumably, the pattern enhancement results from an actual gradient of individual color enhancements that intensify some colors (the original darker colors) more than other colors (the original lighter colors). Of course, depending upon the exact sandstone makeup, some initial colors may or may not be intensified.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A sandstone product having enhanced coloration over a starting sandstone's natural colors, whereby said enhanced coloration is produced by a step comprised of heating the starting sandstone to a first temperature of about 1200° F. to about 1800° F. for a desired period of time.

2. A method of producing an enhancement in the natural coloration of a sample sandstone material, comprising the steps of:
   a) selecting the sample sandstone material having suitable characteristics for said color enhancement method and
   b) heating the sample sandstone material to a first temperature of about 1200° F. to about 1800° F. for a desired period of time.

3. A method of producing a color enhanced stone material comprising the steps of:
   a) obtaining a piece of sandstone having characteristic chemical and physical properties that permit enhancement of the natural color of said piece of sandstone by the subject method;
   b) shaping said piece of sandstone into a tile;
   c) heating said tile to a first temperature of between 1200° F. and 1800° F. for a desired period of time;
   d) coating said tile, after heating said tile to said first temperature, with a glaze; and
   e) heating said glazed tile to a second temperature between 1800° F. and 2500° F.

* * * * *